United States Patent [19]

Addink et al.

[11] Patent Number: 4,795,725
[45] Date of Patent: Jan. 3, 1989

[54] METHOD FOR THE MANUFACTURE OF REFRACTORY BRICKS CONTAINING CAO

[75] Inventors: Jaap H. Addink, Heemskerk; Christiaan M. J. M. Beelen, Alkmaar; Adam Steen, Heemskerk; Hendrik M. Verhoog, Bennebroek; Jurrie De Boer, Castricum, all of Netherlands

[73] Assignee: Hoogovens Groep B.V., Netherlands

[21] Appl. No.: 721,542

[22] Filed: Apr. 9, 1985

[30] Foreign Application Priority Data

Apr. 26, 1984 [NL] Netherlands .................. NL8401337

[51] Int. Cl.$^4$ .............................................. C04B 35/04
[52] U.S. Cl. .................................... 501/101; 264/122; 524/378; 524/433
[58] Field of Search ............... 501/101; 524/378, 433; 264/122

[56] References Cited

U.S. PATENT DOCUMENTS 2,798,002  7/1957  Porter ................................. 501/101
4,248,638  2/1981  Yomota et al. .................... 501/101
4,539,343  9/1985  Nishimura ......................... 524/433

FOREIGN PATENT DOCUMENTS 54-161611  12/1979  Japan .
55-130868  10/1980  Japan .................................. 501/101

Primary Examiner—James Derrington
Attorney, Agent, or Firm—Stevens, Davis, Miller & Mosher

[57] ABSTRACT

In the manufacture of refractory bricks containing CaO, a mixture is formed of a refractory composition of a material containing CaO and a binder composition, and bricks are moulded from the mixture. To avoid hydration of the CaO and avoid softening of the bricks on heating up, the material containing CaO is selected from burned lime, burned dolomite and mixtures and the binder composition is present in an amount in the range 1 to 10% by weight based on the weight of the mixture and consists mainly of a thermosetting novolak type phenol resin composition and an anhydrous solvent consisting of at least one organic solvent present in an amount of less than 40% by weight based on the weight of the binder. The solvent composition is chosen to be of a chemical nature such that, at least during mixing of the refractory composition and the binder composition, it substantially does not react with the CaO.

3 Claims, 2 Drawing Sheets

METHOD FOR THE MANUFACTURE OF REFRACTORY BRICKS CONTAINING CAO

BACKGROUND OF THE INVENTION

1. FIELD OF THE INVENTION

The invention relates to a method for the manufacture of refractory bricks containing CaO, comprising the steps of forming a mixture comprising a refractory composition consisting at least partly of a material containing CaO and a binder composition, and moulding bricks from the mixture.

The invention also provides refractory bricks manufactured by the method, and a refractory structure consisting at least partly of the refractory bricks.

2. DESCRIPTION OF THE PRIOR ART

Refractory bricks containing CaO known in practice are pitch-bound bricks based on burned dolomite. These have the following disadvantages:

(i) The bricks cannot be used after moulding without further treatment, as the refractory structure made from the brick would be damaged during heating up as a result of the softening of the pitch. Therefore, after moulding, the bricks must be subjected to a heat treatment, which usually consists thereof that the bricks are refined for several 24-hour periods at a temperature in the range of 280° C. to 350° C.; by this treatment a part of the volatile components is driven from the pitch, so that the bricks subsequently have sufficient strength during heating up of the refractory structure. This refinement treatment requires much energy and is expensive. In addition, there are bricks that are fired at a temperature in the range of 1600°–2000° C.; in this way, bricks with ceramic bonding are obtained.

(ii) The use of pitch as a binder for refractory bricks has ergonomic disadvantages.

(iii) After manufacture, and until use in a refractory structure, the bricks must be protected against hydration of the CaO to Ca(OH)$_2$ by the humidity of the air. For this purpose, the bricks stored on pallets are usually shut off from the air by an enclosure, e.g. a plastic shrink foil, and/or are kept in a space subject to air conditioning. This prevents the bricks from pulverising as a result of the increase in volume occurring on hydration.

For a magnesia carbon brick, the use of a solution of novolak resin is proposed in U.S. Pat. No. 4,248,638. The usual solvent for novolak resin is ethylene glycol, which as explained below is not suitable for use with CaO-containing mixtures because it causes hydration of CaO and premature hardening of the mixture. For this reason in JP-A-No. 79.161611 (extracted in Chemical Abstracts, Vol. 92, No. 26, June 1980, page 272, abstract no. 219825f) it is proposed to use a modified novolak resin with CaO containing refractory material. The modified resin is a liquid and does not require a solvent. However, this modified resin is expensive to manufacture.

SUMMARY OF THE INVENTION

The object of the invention is to provide a method for the manufacture of refractory bricks containing CaO in which the above-mentioned disadvantages are at least partly avoided and by which bricks of an improved quality are obtained.

According to the invention the material containing CaO is burned lime, burned dolomite or a mixture thereof; and the binder composition is present in an amount in the range 1 to 10% by weight based on the weight of the mixture and consists mainly of a thermosetting novolak type phenol resin composition and an anhydrous solvent for said resin composition consisting of at least one organic solvent present in an amount of less than 40% by weight based on the weight of the binder composition, the solvent composition being of a chemical nature such that, at least during mixing of the refractory composition and the binder composition, it substantially does not react with the CaO.

The use of a phenol resin of the novolak type in the binder composition for the refractory bricks presents no objections of an ergonomic nature. The novolak resin, after decomposition under operating conditions, yields a high carbon residue, so that bricks with good characteristics are obtained. The novolak resin, in the form of a solution in which the resin particles are dissolved, is mixed with a refractory composition so that a homogeneous mixture is obtained. For this reason also, bricks with good characteristics are obtained.

The choice of the solvent is very important. It must substantially not react with CaO, at least during mixing of the mixture. Tests have shown that ethylene glycol, which is conventionally used as a solvent for novolak resin, reacts with CaO. Presumably a metal complex is formed with formation of water, so that the CaO hydrates. Both reactions are exothermic so that, if ethylene glycol is used, the novolak resin hardens prematurely, at least locally, in the poorly heat-conducting mixture. Likewise propylene glycol is not suitable. This defect is avoided by the choice of the solvent composition according to the invention.

The solvent should be more unlike water than these glycols. That is the hydroxy groups should not be on adjacent carbon atoms. Polyglycols are suitable. Preferably however, non-hydric or monohydric solvents, that is solvents not having or having only one hydroxy group are used. Non-hydric or monohydric ethers of glycols are very suitable.

With the limited amount of solvent composition, specified according to the invention, green bricks of acceptable strength are obtained, and the mixture is still sufficiently mouldable. The green bricks do not have to be refined after moulding, because the binder composition, when raised to a higher temperature, does not soften or hardly softens. The bricks according to the invention are cheaper than refined bricks because the extra cost of using the resin is less than the cost of refinement.

The invention is not limited to the use of burned dolomite as the refractory component, but burned lime or a mixture of burned dolomite and burned lime may alternatively be used.

The bricks according to the invention can find uses in a wider field than the known dolomite bricks. Apart from application in a converter for the production of steel, their use in steel ladles and torpedo cars is also feasible.

Although the bricks of the invention do not in general need refinement after moulding, it is preferred to include the step of causing the binder composition to harden by supplying heat, after moulding of the bricks. More preferably, the bricks are subjected to a temperature in the range of 100°–200° C. for a period of 0.25–6 hours. Surprisingly, it has appeared that, after this hardening treatment, the bricks are completely or practically completely insensitive to hydration of the CaO so that the bricks, after hardening, do not need to be protected and/or specially stored as described above for known bricks. To promote hardening, a small amount of hardener is added to the mixture.

Preferably, the binder composition contains less than 25 wt. %, more preferably less than 20 wt. % of the solvent composition, relative to the weight of the binder composition. In this way better cold compression strength and edge strength of the green brick is obtained. Such bricks are easier to handle.

Because of the low amount of solvent composition present, degassing during heating of the bricks is also reduced. Nevertheless, degassing when using one solvent with a sharply fixed boiling point must be very rigorously controlled. The danger exists of the bricks exploding during degassing.

A further preferred feature thus consists in that the solvent composition consists at least two mutually miscible solvents having different boiling points, which solvents determine the boiling range of the solvent composition; because boiling occurs over a temperature range, due to the use of a mixture of two or more solvents, the risk of the bricks cracking and perhaps falling apart as a result of degassing during heating is reduced.

It is also preferred that the binder composition has a dynamic viscosity in the range 3000–30,000 m.Pa.s at 75° C. Because of this exceedingly high viscosity, it is achieved that the bricks after moulding can be released easily and do not tend to crack. The viscosity also contributes to better compression strength, edge strength and suitability for handling of the green bricks.

To improve the refractory quality of the bricks, 4–25 wt. % of carbon relative to the weight of the mixture, may also be included in the mixture, preferably in the form of graphite, more preferably natural graphite.

Also to improve the refractory quality, burned magnesite may be included in the mixture.

The invention extends to refractory bricks manufactured by the method according to the invention and to a refractory structure consisting at least partly of refractory bricks made by the method.

DESCRIPTION OF PREFERRED EMBODIMENTS

Figure 1:
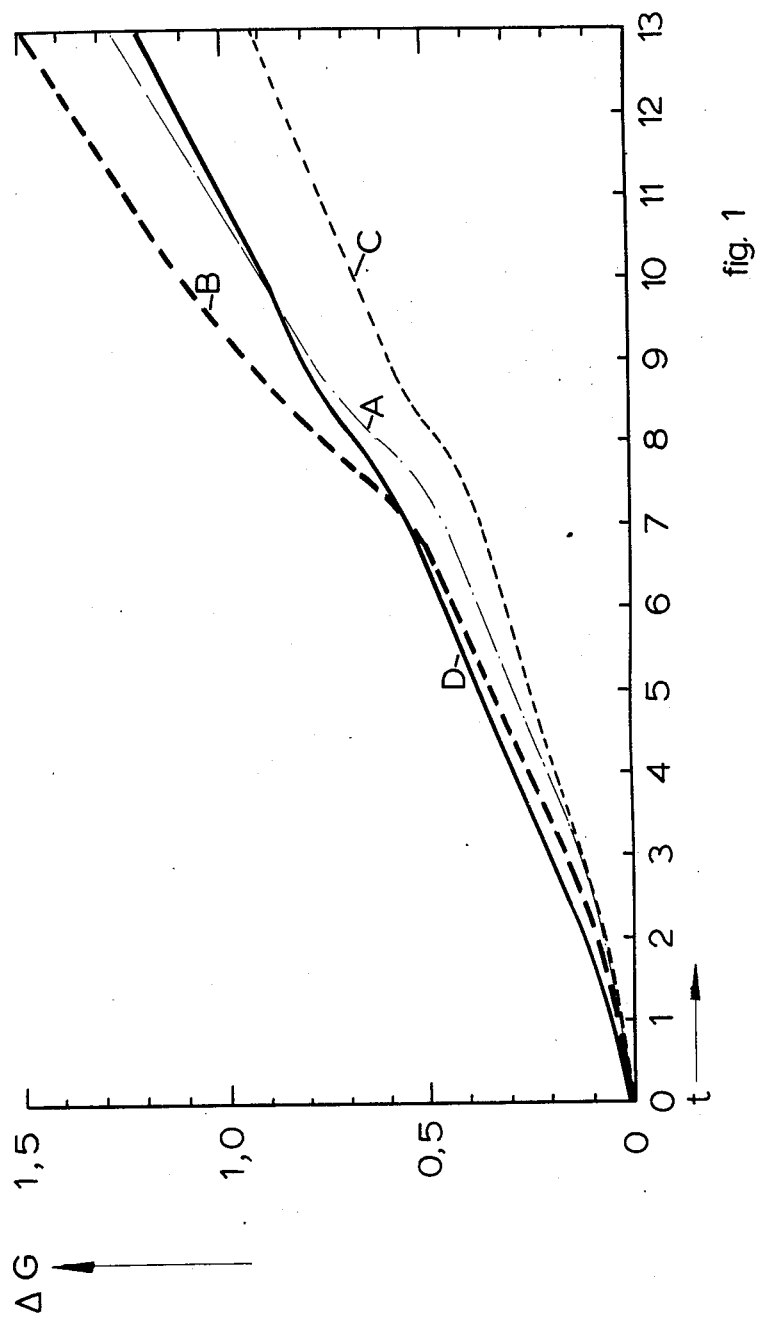

Some examples, including comparative examples, are given below to illustrate the invention non-limitatively.

EXAMPLE 1 (COMPARATIVE)

As a qualitative test, a first mixture I was made of the following components:
grains of burned dolomite
novolak solution and
hexamethylenetetramine (hereafter called hexa) as hardener.

In the novolak solution, the novolak resin was dissolved in conventional solvent, ethylene glycol. During mixing, an increase in temperature of the mixture and a strong smell of ammonia were observed. After mixing, the mixture was unmouldable as it had at least partly hardened.

Subsequently, three further compositions were mixed in the combinations II, III and IV, according to the following Table I.

TABLE I

| Combination | I | II | III | IV |
|---|---|---|---|---|
| Dolomite grains | x | x | x | x |

TABLE I-continued

| Combination | I | II | III | IV |
|---|---|---|---|---|
| Novolak resin in a solution of ethylene glycol | x | x | — | — |
| Ethylene glycol | — | — | x | — |
| Novolak resin grains | — | — | — | x |
| Hexa | x | — | — | — |
| Result A = hardens B = does not harden | A | A | A | B |

After mixing, combinations II and III were also unmouldable because of hardening. With combination IV, the premature hardening phenomenon did not occur.

EXAMPLE 2

Starting in each case from the grain distribution and resin quantities given in Table II below, three moulding mixtures A, B and C were made, the novolak resin compositions being given and their properties being given in Table III.

TABLE II

| Composition (wt. %) | | |
|---|---|---|
| Dolomite | 4–6.3 mm | 42.80 |
| | 2–4 mm | 14.25 |
| | 1–2 mm | 6.65 |
| | 0–1 mm | 31.35 |
| Novolak resin solution | | 4.50 |
| hexa (= hardener) | | 0.45 |

TABLE III

| The resins used have the following properties: | | | | |
|---|---|---|---|---|
| Moulding mixture | A | B | C | D |
| Solvent | Mixture of poly-glycols | Mixture of poly-glycols | Mixture of poly-glycols | Mixture of monohydric ethers of glycols |
| Quantity of solvent (%) | 20 | 20 | 15 | 15 |
| Viscosity of the binder composition (m Pa.sec at 75° C.) | 12000 | 12480 | 19700 | 12470 |
| Free phenol (%) | 0.2 | 0.2 | 0.1 | 0.4 |
| Alcan figure (%) | 60 | 64 | 60 | 64 |

The physical properties of the bricks manufactured from moulding mixtures A, B, C and D are given in the following Table IV. For comparison, the values for pitch-bonded dolomite bricks are also given.

TABLE IV

| | Bricks from moulding mixtures A, B, C and D | pitch-bonded dolomite bricks |
|---|---|---|
| Cold compression strength of the green brick (N/mm²) | 50.9–55.1 | 42.1–50.2 |
| Cold compression strength after hardening for 2 h at 150° C. (N/mm²) | 83.8–86.3 | — |
| Hot compression strength (N/mm²) at | | |
| 100° C. | >>4.5* | 0.25–0.40 |
| 200° C. | >>4.5* | 0.17–0.20 |
| 300° C. | >>4.5* | 0.14–0.18 |
| 400° C. | >>4.5* | 0.12–0.13 |
| 500° C. | >>4.5* | 3.80–5.10 |
| Before firing | | |
| Real porosity (%) | 8.1–8.4 | 7.4–6.6 |
| Apparent density (kg/m³) | 2833–2836 | 2924–2936 |
| Real density (kg/m³) | 3081–3087 | 3145–3157 |
| After firing 4 h 1500° C. | | |
| Real porosity (%) | 15.4 | 15.5–16.7 |
| Apparent density (kg/m³) | 2821–2826 | 2862–2890 |
| Real density (kg/m³) | 3333–3341 | 3434–3419 |

TABLE IV-continued

| | | |
|---|---|---|
| Carbon residue (wt. %) | .2.9–3.2 | 2.3–2.6 |
| Heat loss (wt. %) | 4.7–5.0 | 4.5–4.8 |
| Resistance to slag attack** (relative) | 1 | 0.8 |

Notes:
*The apparatus for the measuring of the hot compression strength is suitable for the low values obtained with pitch bonded bricks. The upper limit of the measuring range is 4.5 N/mm². It was found that the hot compression strength of the resin bonded bricks was more than 4.5 N/mm² in all cases. In view of the value obtained for the cold compression strength after hardening, it is clear that the hot compression strength is at least at the level of the cold compression strength of the green brick and therefore is larger than that of pitch bonded bricks.
**The resistance to slag attack was determined by subjecting test pieces, at 1650° C., to attack by a synthetic aggressive slag, consisting of:
CaCO₃: 30%
SiO₂: 30%
FeO: 30%
MnO: 6%
CaF₂: 4%
The test pieces were subjected to this slag for one hour, the slag being replaced by a fresh slag of the same composition after the first half hour. In this test, the degree of attack by the slag is determined from the amount of brick material that has been removed.

fresh slag of the same composition after the first half hour. In this test, the degree of attack by the slag is determined from the amount of brick material that has been removed.

From Table IV, it can be seen that the hot compression strength, the amount of carbon residue and the resistance to slag attack of the resin-bonded dolomite brick are all much better than in the case of the pitch-bonded dolomite brick.

EXAMPLE 3

From each of the moulding mixtures A, B and C of Tables II and III above, a series of 10 test pieces was made for the purpose of weathering tests. For comparison, 10 test pieces were also made from a pitch-bonded dolomite mixture D. The sizes of the test pieces were 50×50 mm. All the test pieces showed damage in the form of exposed dolomite as a result of their removal from the mould.

Of each series, 8 test pieces were exposed to the air, without previous heat treatment, for two weeks. In order to determine their weight increase, the test pieces were weighed daily. In FIG. 1 of the accompanying drawings the weight increase $\Delta G$ is indicated, as a percentage of the weight of the test piece against time t in days. This weight increase is the result of hydration to $Ca(OH)_2$ of CaO by $H_2O$ from the air. The result is an increase in volume, which eventually leads to falling apart of the refractory product. All these resin bonded and pitch bonded test pieces, after being exposed to the air for one week, were found to be so weather-beaten by the humidity of the air that they could no longer be used as refractory products.

Figure 2:
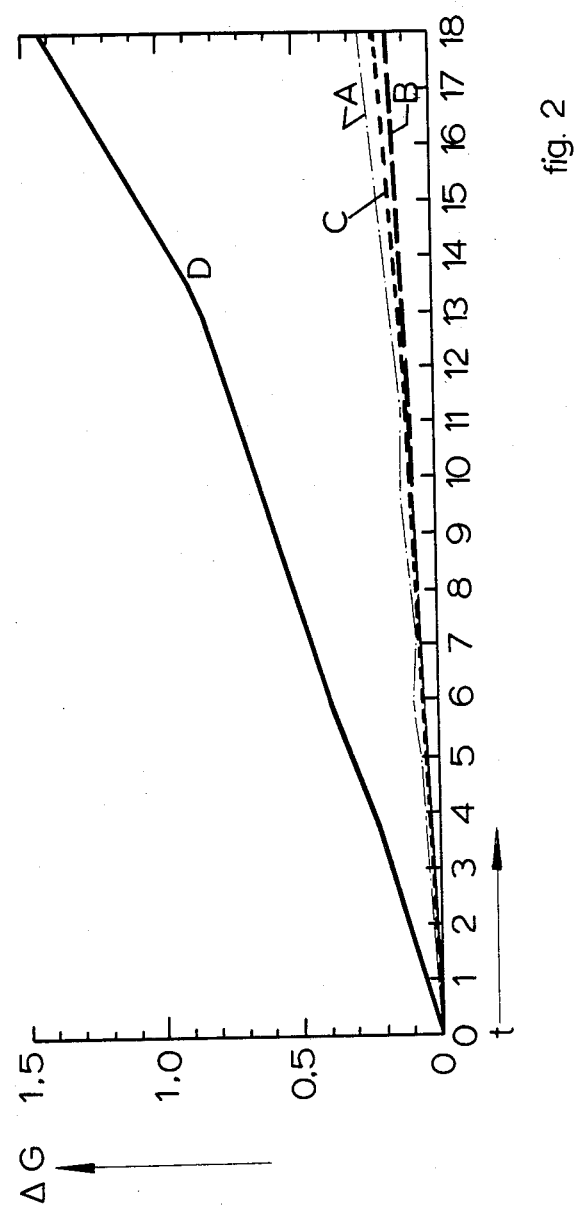

The two remaining test pieces of each series were hardened at 150° C. Subsequently, these test pieces were also exposed to the air for 18 days. FIG. 2 of the accompanying drawings is a graph giving the weight increase $\Delta G$ of these test pieces on the same basis as FIG. 1. The hardened resin-bonded test pieces show a very slight weight increase, whih presumably is the result of weathering of the exposed dolomite particles on the outside, but no or practically no weathering by air humidity occurs. These test pieces are insensitive to hydration of CaO. The difference with the pitch bonded dolomite test pieces D, which undergo considerable weight increase, is very remarkable.

What is claimed is:

1. Method for the manufacture of refractory bricks containing CaO, comprising the steps of
   (a) mixing a refractory composition consisting essentially of a material containing CaO selected from the group consisting of burned lime, burned dolomite and a mixture thereof, 4 to 25% by weight of carbon and a binder composition, the binder composition being present in an amount in the range 1 to 10% by weight based on the weight of the mixture and consisting mainly of a thermosetting novolak type phenol resin composition and an anhydrous solvent for said resin composition consisting of at least one organic solvent present in an amount of less than 40% by weight based on the weight of the binder composition, wherein the solvent composition is of a chemical nature such that, at least during mixing of the refractory composition and the binder composition, it substantially does not react with the CaO; and
   (b) molding bricks from the mixture said solvent composition consisting of at least one polyglycol or at least one nonhydric or monohydric solvent.

2. Method for the manufacture of refractory bricks containing CaO, comprising the steps of
   (a) mixing a refractory composition consisting essentially of a material containing CaO selected from the group consisting of burned lime, burned dolomite and a mixture thereof, 4 to 25% by weight of carbon and a binder composition, the binder composition being present in an amount in the range 1 to 10% by weight based on the weight of the mixture and consisting mainly of a thermosetting novolak type phenol resin composition and an anhydrous solvent for said resin composition consisting of at least one organic solvent present in an amount of less than 40% by weight based on the weight of the binder composition, wherein the solvent composition is of a chemical nature such that, at least during mixing of the refractory composition and the binder composition, it substantially does not react with the CaO;
   (b) molding bricks from the mixture; and
   (c) heating the molded bricks to cure the binder composition, said solvent composition consisting of at least one polyglycol or at least one nonhydric or monohydric solvent.

3. Method for the manufacture of refractory bricks containing CaO, comprising the steps of
   (a) mixing a refractory composition consisting essentially of a material containing CaO selected from the group consisting of burned lime, burned dolomite and a mixture thereof, 4 to 25% by weight of carbon and a binder composition, the binder composition being present in an amount in the range 1 to 10% by weight based on the weight of the mixture and consisting mainly of a thermosetting novolak type phenol resin composition and an anhydrous solvent for said resin composition consisting of at least one organic solvent present in an amount of less than 40% by weight based on the weight of the binder composition, wherein the solvent composition is of a chemical nature such that, at least during mixing of the refractory composition and the binder composition, it substantially does not react with the CaO; and (b) molding bricks from the mixture, said solvent composition consisting of at least two mutually miscible solvents having different boiling points and selected from the group consisting of at least one polyglycol and at least on nonhydric or monohydric solvent, said solvents determining the boiling range of the solvent composition.

* * * * *